United States Patent

[11] 3,612,088

| [72] | Inventor | James R. McBurnett<br>Stillwater, Okla. |
|---|---|---|
| [21] | Appl. No. | 873,392 |
| [22] | Filed | Nov. 3, 1969 |
| [45] | Patented | Oct. 12, 1971 |
| [73] | Assignee | Allis-Chalmers Manufacturing Company<br>Milwaukee, Wis. |

[54] THROTTLING DRAFT CONTROL VALVE
10 Claims, 2 Drawing Figs.

[52] U.S. Cl. .................................................... 137/116.3,
91/447, 91/454, 137/596.15
[51] Int. Cl. ............................................. F15b 5/00
[50] Field of Search ............................................. 137/596.15,
116.3; 91/447, 454

[56] References Cited
UNITED STATES PATENTS
2,861,550  11/1958  Hanna et al. ................... 91/454 X
Re. 26,523  2/1969  Tennis .......................... 137/596.15 X

*Primary Examiner*—Robert G. Nilson
*Attorneys*—Arthur L. Nelson, Kenneth C. McKivett and
Robert B. Benson ABSTRACT: A throttling draft control valve having a pressure control chamber with fluid pressure feedback for supplying pressurized fluid to a hydraulic actuator and releasing the pressurized fluid from the hydraulic actuator and releasing the pressurized fluid from the hydraulic actuator at a controlled rate in response to a position signal.

PATENTED OCT 12 1971

3,612,088

Inventor
James R. McBurnett
by
Arthur W. Wilson
Attorney

THROTTLING DRAFT CONTROL VALVE

This invention relates to a draft control valve and more particularly to a throttling draft control valve having a pressure control chamber and a position control valve to supply pressurized fluid to a hydraulic actuator and release the pressurized fluid from the hydraulic actuator in response to the positioning of the control valve spool.

The implement used in combination with the tractor may be fully mounted, semimounted or a trail-behind type of implement and the implement is usually controlled through a hydraulic system having a hydraulic actuator. With the trail-behind implement a sudden increase of the draft load pressure can increase with the change in the ground conditions. With the trail-behind implement a sensing means will sense an increase in the draft load which produces a force signal transmitted to the control valve spool which controls the pressure in the system and redistributes the weight of the implement and the tractor. The result will be an increase in weight on the rear wheels of the tractor which will accordingly increase the traction of the tractor to accommodate the required increase in the draft load.

Under these conditions, the draft control valve functions as a pressure control valve by virtue of the feedback signal to the hydraulic system. System pressure will increase with an increase in draft load for the purpose of increasing the weight transferred to the rear wheels of the tractor thereby improving the traction.

When it is desired that the implement be lifted from the field operating position, a remote valve can be operated to provide flow of pressurized fluid to operate a hydraulic actuator which in turn through the lift linkage will lift the vehicle to a transport position. The transport position is then maintained until such time at which the implement will again be lowered to the field operating position.

Accordingly this valve is intended to operate with a fully mounted, semimounted or trail-behind type of implement. The control valve provides a means to manually operate the valve to provide fluid flow for lifting or lowering the implement. During the lifting of the implement pressurized fluid will flow in response to the positioning of the control valve spool which in turn controls the pressure in the pressurizing chamber which is fed back to a throttling spool which controls the supply of pressurized fluid to the hydraulic actuator. When the hydraulic actuator force equals the load a throttling spool returns to a neutral position. When the implement is lowered the control valve spool is moved in the reverse direction to open the poppet valve to release the pressurized fluid in the actuator and permit the lowering of the implement in response to discharge pressurized fluid from the actuator. The rate of lowering of the implement is controlled by metering orifices on the control valve spool which control the rate of flow from the hydraulic actuator to sump.

It is an object of this invention to provide a throttling draft control valve having fluid pressure feedback to control the pressure of hydraulic fluid supplied to the hydraulic actuator.

It is another object of this invention to provide a pressure chamber controlled by a position control valve regulating the pressure of hydraulic fluid supply to the hydraulic actuator.

It is another object of this invention to provide a throttling draft control valve having a position control valve spool regulating the pressure in the pressure chamber with feedback means to control the pressure and rate of flow to the hydraulic actuator in the system.

It is a further object of this invention to provide a throttling draft control valve having a pressure control chamber with pressure feedback to control the discharge flow from the hydraulic actuator to sump in response to positioning of the spool of a position control valve.

The objects of this invention are accomplished by providing a throttling draft control valve in a load sensitive closed center hydraulic system. The draft control valve has a control valve spool whereby the spool position controls the pressure in a pressure chamber. The pressurized fluid from the pump is supplied through a throttling spool and produces a pressure in a pressure control chamber in response to the position of the control valve spool. A pilot signal is sensed from the pressure chamber and supplied to the compensator of the variable displacement pump.

The throttling spool is positioned to receive pressurized fluid from the pump and operates in response to the throttled pressure from the pump to the one side of the spool. The spool is positioned in response to the pressure acting on the opposite ends of the spool and shifts to permit the flow of pressurized fluid to the hydraulic actuator. The rate of flow to the hydraulic actuator is controlled by the differential pressure operating on the spool.

The pressurized fluid in the hydraulic actuator will be released in response to the position of the control spool to sump thereby lowering the load.

The preferred embodiments of this invention will be illustrated and described.

Figure 1:
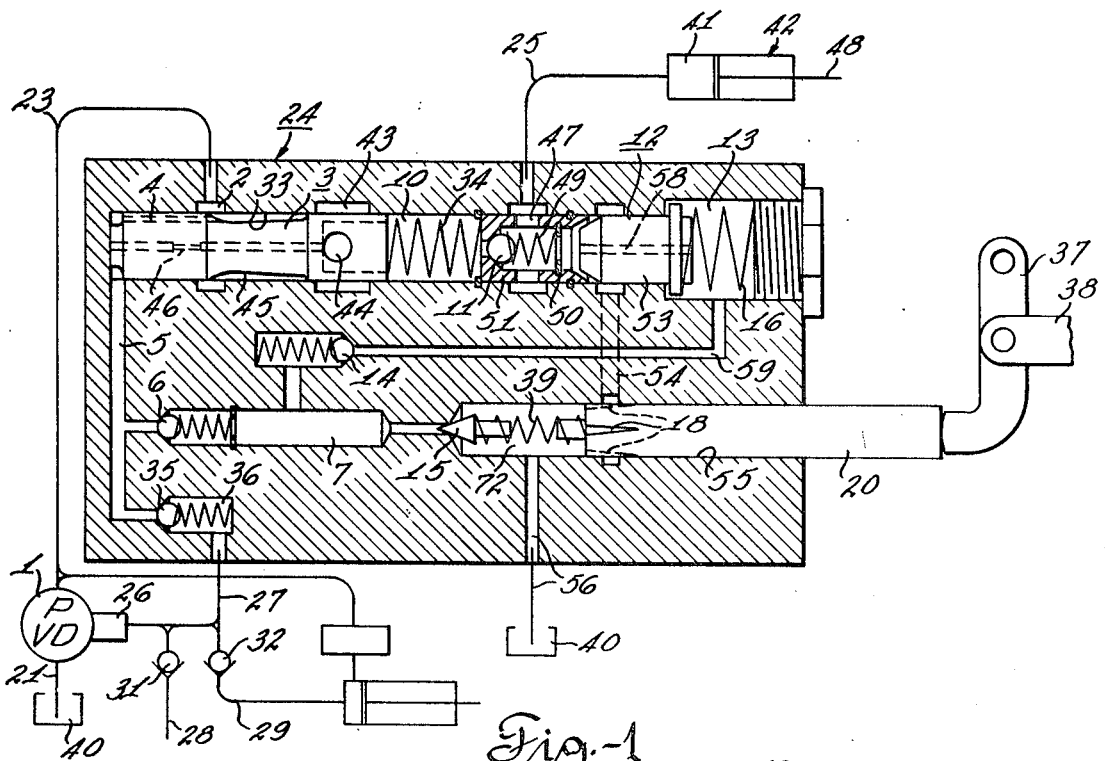
FIG. 1 illustrates the draft control valve in the hydraulic system with the control valve positioned for discharge of the hydraulic actuator.

Referring to the drawings FIG. 1 shows a variable displacement pump 1 connected to the conduit 21 for receiving fluid from the reservoir 40. The pump discharges into the conduit 23 and supplies pressurized fluid to the supply chamber 2 in the valve housing 24.

The variable displacement pump includes a compensator 26 connected to the pilot conduit 27 coming from the housing 24. The remote pilot lines 28 and 29 supply pressurized fluid from a remote hydraulic actuator in the system. The pressurized fluid from the remote actuators is supplied through the check valves 31 and 32 respectively. Pressurized fluid from the pump 1 is supplied to the supply chamber 2 is throttled through the orifice 4 to the left and side of the throttling spool 3. The throttling spool 3 moves reciprocally within the cylindrical opening 33 and is biased to the left-hand position by the spring 34. Throttling of pressurized fluid through the orifice 4 produces a drop in pressure to the passage 5, the pressure in passage 5 flows through the check valves 6 into the pressure control chamber 7. The pressure also will pass through the check valve 35 and the pressure in the pilot chamber 36 will be substantially equal to the pressure in the pressure chamber 7. The pilot chamber 36 connects to the compensator 26 through the pilot conduit 27. The pressure in the pressure control chamber 7 is controlled by the position of the control valve spool 20. The control valve spool 20 is operated by the control lever 37 operated by a suitable linkage which may be a manual means and an automatic means sensing draft load connected to the arm 38.

The position of the control spool 20 controls the compression on the spring 39 operating against the valve element 15. The pressure in the pressure control chamber 7 builds up in the chamber and also builds up in the pilot chamber 36. The pressure in the pilot chamber is fed back to the compensator and the variable displacement pump increases the stroke and increases the pressure of the hydraulic fluid delivered from the pump which in turn builds up in the supply chamber 2.

Figure 2:
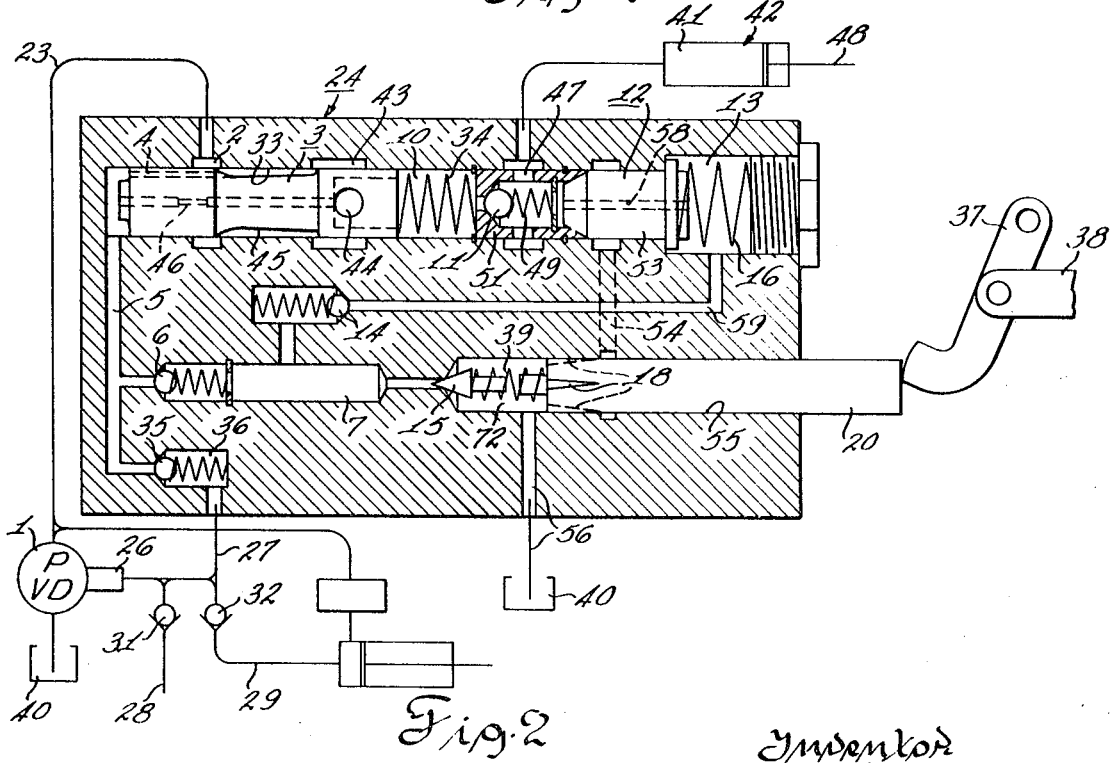
FIG. 2 illustrates the hydraulic valve in the position for supplying pressurized fluid to the actuator.

FIG. 2 illustrates the positioning of the control valve spool 20 wherein the spring 39 is compressed which more firmly seats the valve element 15 on its valve seat preventing the discharge of pressurized fluid from the pressure control chamber 7 to sump 40. When the control lever 37 is operated in response to automatic means, the draft load increases which in turn demands an increased pressure in the pressurizing chamber 41 of the hydraulic actuator 42. Accordingly increased pressure in the passage 5 will displace the throttling spool 3 in the right-hand direction. A sufficient movement will place communication between the supply chamber 2 and the actuator chamber 10. The peripheral chamber 43 is in communication with the supply chamber 10 through a plurality of orifices 44. With passage of pressurized fluid through the grooves 45 the pressure builds up on the right-hand side of the pressure operated spool 3 thereby tending to displace the spool 3 in the left-hand direction and cutting off communication through the grooves 45. It is understood that a restricted passage 46 will also transmit a limited amount of pressurized fluid from the left-hand side to the right-hand side of the pressure operated spool 3. The pressure in the pressure control chamber 7 however controls the positioning of the spool 3 and the flow of pressurized fluid from the supply chamber 2 to the actuator chamber 10.

As the pressure in the actuator chamber 10 builds up the check valve 11 will be unseated causing the flow of pressurized fluid to the actuator port 47 permitting the pressurized fluid to flow through the conduit 25 into the pressurized chamber 41 of the actuator 42. This in turn will cause a movement of the load connected to the piston rod 48. As previously described for the purpose of illustration, the load may be an implement.

The check valve 11 consists of the ball operated by the spring 49 engaging the snap ring 50. The check valve 11 is seated on the sleeve 51 within the cylindrical opening 33 of the housing 24. Snap rings 70 and 71 maintain a fixed position of the sleeve 51 in opening 33 of housing 24.

The discharge of pressurized fluid from the pressurizing chamber 41 of the hydraulic actuator 42 is accomplished by fluid flowing through the poppet valve 12 which consists of the valve element 53 seated on the sleeve 51.

Discharge of pressurized fluid from pressurizing chamber 41 of the actuator 42 flows through the poppet valve 12. The flow passes through the discharge passage 54 to the valve chamber 72 formed in opening 55 receiving the control valve spool 20. With the orifices 18 in the position shown at FIG. 1, the pressurized fluid flows through the discharge passage 54 through the chamber 72 through conduit 56 to sump 40.

When the control valve spool 20 is in the position shown in FIG. 2 however, the pressurized fluid cannot flow through the discharge passage 54 and although a limited amount of pressurized fluid flows through the orifice 58, passage 59 and check valve 14 the flow of the fluid is limited by the position of the control valve spool 20 which increases the pressure in the pressure control chamber 7. Accordingly, the pressure in the pressure control chamber 7 is sufficiently high to prevent flow of pressurized fluid through passage 59, check valve 14 through the pressure control valve 15 to sump.

The operation of the device will be subsequently described. The draft control valve as shown operates with the variable displacement pump. THe pump is a load sensitive type having an inlet 21 from the sump 40. A small quantity of fluid travels through the orifice 4 in spool 3 downwardly through passage 5 to the ball check valve 6 to the pressure control chamber 7. The pressure in the pressure control chamber 7 is determined by the spring rate of spring 39 and the position of the draft control valve spool 20. The pilot signal is determined by the spring rate and the positioning of the draft control valve spool 20 and also the pressure level at the left-hand end of the throttling spool 3. For the purpose of illustration the throttling pressure drop will be assumed to be equal to approximately 250 p.s.i. so long as the remote valves 31 and 32 are closed and the remote hydraulic actuators are operating at a pressure lower than that required by the draft control valve. In any case the pressure level at the left-hand end of the throttling spool 4 is determined by the spring load of spring 39. Normally this pressure level will be from 0 to 2,000 p.s.i.

The pressure on the right-hand end of the throttling spool 3 in the actuating chamber 10 must be nearly equal to that of the left-hand end. If it is less than the pressure on the left-hand end the spool will shift to the right admitting pressure from the pump to the chamber 43 on the right-hand end of the spool. If this pressure is greater than the load pressure the fluid will flow through the check valve 11 to lift the load 48 on the hydraulic actuator 42. Under these conditions the lowering poppet valve 12 is tightly on its seat and the lowering poppet spring chamber pressure 13 is trapped by the ball check 14 and is equal to the load pressure valve 15. If the load pressure on valve 15 is higher than the setting on the poppet valve 12 a small amount of oil will flow through the check valve 14 around the valve 15 to sump. If this load gets to be great enough the pressure drop across the lowering poppet valve 12 will overcome the spring 16 and open the poppet valve. The additional fluid may then be exhausted through poppet valve 12 through the oil passage 59 and through the metering grooves 18 on the spool 20 to sump 40.

Assuming everything is in equilibrium at shutoff of the engine and no additional draft or position signal is received, the load will be locked in its position since the hydraulic fluid will be trapped by the check valve 11, the poppet valve 12, check valve 14 and the main pressure control valve 15.

If it is desired to lower the load with the engine off, the spring load 39 of the main poppet valve 15 is relaxed somewhat and the load pressure then unseats the main poppet valve 15. If the lowering flow rate is great enough the poppet valve 12 will unseat and additional fluid will flow through the passage and through the metering grooves to the sump.

This invention provides a means whereby the actuator 42 is satisfactorily isolated from the external remote signals coming through pilot line 28 and 29. The lift cylinder pressure is completely controlled by the input position signal on the draft control spool 20. If the engine should die or shut off the load may be lowered with the engine off without any problem. The valve is essentially a throttling type, therefore, the pump load is always at least equal to the load pressure. The pressure feedback from the valve is transmitted through hydraulic fluid and no mechanical linkage is necessary to reposition the throttling spool.

The embodiments of the invention in which an exclusive property or privilege is claimed are defined as follows:

1. A draft control valve means comprising housing means defining a pressure control chamber and a cylindrical spool opening connected by a pressure feedback passage, a draft control valve including a draft control valve housing defining a spool opening and a draft control valve spool received in said spool opening, means defining a vent passage adapted for communication to sump including a pressure control valve connected between said pressure control chamber and said spool opening of said draft control valve, a valve element of said pressure control valve resiliently connected to said draft control valve spool and biased to a closed position controlling pressure in said pressure control chamber in response to draft control valve spool position, means defining an inlet port adapted for connection to a source of pressurized fluid and an actuator port adapted for connection to a hydraulic actuator with said ports connected to said cylindrical spool opening, a throttling spool in said cylindrical spool opening defining throttling passage means in communication with said inlet port and said feedback passage, said throttling spool defining groove passage means for selective and alternative connection between said inlet port and said actuator port in response to fluid pressure in said feedback passage, means biasing said throttling spool to normally prevent communication between said inlet port and said actuator port, a restricted passaged means connected across the said throttling spool to provide limited flow between said pressure feedback passage and said actuator port, means defining a discharge passage including a discharge valve connected between said actuator port and said draft control valve, means defining bleed passage means connecting said hydraulic actuator port with said pressure control chamber including a check valve for reducing the pressure in said hydraulic pressure actuator port relative to that of the pressure control chamber, said draft control spool of said draft control valve thereby controlling the opening pressure of said pressure control valve and the pressure in said pressure control chamber and controlling the discharge pressure from said hydraulic actuator port in response to positioning of the draft control valve spool of said draft control valve.

2. A draft control valve means as set forth in claim 1 wherein said draft control valve spool defines metering grooves for metering the flow of pressurized fluid through the discharge valve.

3. A draft control valve means as set forth in claim 1 wherein said cylindrical spool opening and said throttling spool define an actuator chamber connected to said actuator port, a check valve positioned in said cylindrical spool opening permitting unidirectional flow from said actuator chamber to said actuator port.

4. A draft control valve means as set forth in claim 1 including means defining a pilot pressure chamber connected to said pressure control chamber, a check valve in said pilot pressure chamber, a pilot pressure line connected to said pilot chamber and adapted for connection to a pump compensator, a remote hydraulic actuator, a second pilot pressure line including a second check valve to thereby permit said compensator to sense the highest load pressure of said pilot pressure lines.

5. A draft control valve means as set forth in claim 1 wherein said discharge valve includes bleed passage means transmitting pressurized fluid from said actuator port through said bleed passage means to reduce the pressure in said hydraulic actuator port to substantially the pressure level in said pressure control chamber.

6. A draft control valve means as set forth in claim 1 including a sleeve portion on said throttling spool defining a port, means defining an actuator chamber communicating with said actuator port and encircling said sleeve portion, said sleeve port normally communicating with said actuator chamber, said throttling spool shifting to close communication in response to a high pressure in the pressure feedback passage to thereby limit the peak pressure supplied to said actuator port.

7. A draft control valve means as set forth in claim 1 wherein said throttling passage means normally connects said inlet port to said feedback passage, said throttling spool defines an annular recess connecting said throttling passage means to said inlet port, said throttling spool thereby shifting in response to pressure in said feedback passage and closing communication between said inlet port and said feedback passage and limit peak pressure in said control chamber.

8. A draft control valve means as set forth in claim 1 wherein said discharge valve defines a poppet valve biased to a normally closed position whereby pressure in said actuator port opens said poppet valve to relieve pressure in said actuator port and permit fluid flow to sump when said draft control valve in in an open position.

9. A draft control valve means as set forth in claim 1 wherein said discharge valve defines a poppet valve, said draft control valve spool defines metering grooves defining a variable area orifice, said poppet valve defines a constant pressure chamber whereby said poppet valve and said draft control valve provide a predetermined flow rate for discharging fluid from said actuator port when the load is lowered by said hydraulic actuator.

10. A draft control valve means as set forth in claim 1 wherein said draft control valve spool biases said pressure control valve to a closed position to lock pressurized fluid in said pressure control chamber and blocks flow of pressurized fluid through said discharge valve thereby providing a hold position at said draft control valve means.